United States Patent [19]

Hayes et al.

[11] 3,899,431

[45] Aug. 12, 1975

[54] OIL-IN-WATER MICROEMULSION DRILLING FLUIDS

[75] Inventors: John B. Hayes, Littleton; Gerald W. Haws, Denver; William B. Gogarty, Littleton, all of Colo.

[73] Assignee: Marathon Oil Company, Findlay, Ohio

[22] Filed: Jan. 18, 1973

[21] Appl. No.: 324,710

[52] U.S. Cl. ........... 252/8.5 P; 252/8.5 M; 252/316
[51] Int. Cl. ............................................. E21b 21/04
[58] Field of Search .............. 252/8.5 P, 8.5 M, 315, 252/316

[56] References Cited
UNITED STATES PATENTS

| | | | |
|---|---|---|---|
| 2,718,498 | 9/1955 | Salathiel | 252/8.5 P |
| 2,773,030 | 12/1956 | Tailleur | 252/8.5 P |
| 3,006,846 | 10/1961 | Stratton | 252/8.5 P |
| 3,062,740 | 11/1962 | Reddie et al. | 252/8.5 P |
| 3,219,580 | 11/1965 | Stratton | 252/8.5 P |
| 3,240,700 | 3/1966 | Peacock | 252/8.5 P |
| 3,264,214 | 8/1966 | Stratton | 252/8.5 P |
| 3,275,551 | 9/1966 | Annis | 252/8.5 P |
| 3,734,856 | 5/1973 | Son, Jr. | 252/8.5 P |

*Primary Examiner*—Leland A. Sebastian
*Assistant Examiner*—B. H. Hunt
*Attorney, Agent, or Firm*—Joseph C. Herring; Richard C. Willson, Jr.; Jack L. Hummel

[57] ABSTRACT

Improved fluids for drilling, completing, and workover of wells are obtained with water-external microemulsions containing about 5% to about 90% hydrocarbon, about 10% to about 90% water, about 1% to about 30% of a sodium petroleum sulfonate having an average equivalent weight within the range of about 350 to about 525, and about 0.1% to about 15% of a bentonite clay and optionally about 0.0 to about 20% of a cosurfactant and about 0.001 to about 5% by weight, based on the water, of an electrolyte. These fluids exhibit low resistivity properties which permit better log interpretation and also exhibit lower fluid loss properties than comparable water-based fluids.

15 Claims, No Drawings

OIL-IN-WATER MICROEMULSION DRILLING FLUIDS

BACKGROUND OF THE INVENTION

1. Field of the Invention

This invention relates to drilling fluids, completion fluids, and workover fluids useful in wellbores in fluid communication with subterranean reservoirs. The fluid is a water-external microemulsion.

2. Description of the Prior Art

Water-external emulsion drilling fluids have been used for some time, but stability of the emulsion fluids has always presented problems. These emulsion muds generally contain about 85% to about 90% water, about 10% hydrocarbon, and an emulsifier.

Fresh water muds as well as salt water muds are also useful, but these types of muds have disadvantages over the oil-containing water-external emulsion muds. For example, the emulsion muds have better lubrication characteristics over the water-based muds since they oil-wet the drill string and the bit within the hole. The main benefits of the oil-containing emulsion drilling muds over water-based muds include:

1. increased drilling rates,
2. longer bit life,
3. less torque and drag on the drill pipe,
4. reduction of balling at the bit and sticking on the drill collars,
5. improved hole conditions, e.g. control of sloughing shale, maintenance of hole gauge, etc., and
6. low solids, light-weight muds.

All of these advantages add up to faster drilling with less time and energy requirements at the surface.

Patents representative of the prior art include the following:

U.S. Pat. No. 3,425,940 to Norton teaches a drilling fluid containing 200–1,000 parts of water, 0.03–0.25 of an oil-soluble petroleum sulfonate, 0.03–0.25 part of a solubilizing agent (must be water-soluble), and 0.01–0.1 part of a rust inhibitor. The sulfonate is an alkyl aryl sulfonate wherein the alkyl contains 6–18 carbon atoms ahd the metal is sodium, potassium, etc.

U.S. Pat. No. 3,252,903 to Crittendon teaches an oil-external emulsion drilling fluid containing 20–85% oil, 5–15 lbs/bbl of a polyvalent metal salt of a petroleum sulfonate and 2.5–7.5 lbs/bbl of a polyvalent metal salt of sulfonated sperm oil.

U.S. Pat. No. 2,798,851 to Nelson, Jr. et al. teaches a water-external emulsion drilling fluid obtained by mixing sulfuric acid and petroleum oil at sufficient conditions to obtain a reaction, then adding to the reaction mixture a polyvalent metal base to obtain a water-insoluble salt of the sulfonic acid mixture, and thereafter adding water to the mixture to form the emulsion. The water constitutes about 20–85% by volume of the mixture.

U.S. Pat. No. 2,775,557 to Morgan teaches an improved water-based drilling fluid containing 0.1–5 lbs/bbl of a water-soluble salt of acrylic acid-acrylamide polymer having a molecular weight of at least 10,000.

Other examples of water-external emulsion drilling fluids are found in U.S. Pat Nos. 2,713,032 to Tailleur; 2,718,498 to Salathiel; 2,719,120 to Barron; 3,062,742 to Reddie et al.; 3,086,937 to Fisher.

U.S. Pat. No. 3,215,628 to Peacock teaches a water-external emulsion drilling fluid containing oil, water, and alkali metal salts or alkaline earth metal salts or ammonium salts of a sulfonated blend of about 25–75 weight percent asphalt and about 75–25 weight percent of an oil from the solvent extraction of a deasphalted, dewaxed oil.

U.S. Pat. No. 3,340,188 to Barrett uses a water-external emulsion drilling fluid containing an alkali metal sulfonate of tall oil pitch, an alkali earth metal sulfonate of tall oil pitch, and an ammonium sulfonate of tall oil pitch, the surfactant being present in amounts sufficient to reduce the filtration rate and the coefficient of friction of the drilling fluid.

U.S. Pat. No. 3,410,797 to Walker et al. teaches a water-based drilling fluid containing water and clay to which has been added an organotin compound.

It is known that emulsions are phase unstable, i.e. two phases can appear in the process of drilling a well if the well is shut-in for a sufficient period of time for the emulsion to phase-separate. It is evident that this type of phase separation would necessarily cause problems since there would be a water bottom phase and a hydrocarbon top phase, and the mud components would be present in the phases in which they are more readily dispersible.

SUMMARY OF THE INVENTION

Applicants have discovered a water-external microemulsion useful as a drilling fluid, a completion fluid, or workover fluid in oil wells. The fluid exhibits a low electrical resistivity to aid in log interpretation, a low fluid loss property, and also good stability in the presence of clays. This microemulsion is obtained by mixing water, hydrocarbon, bentonite clay, sodium petroleum sulfonate having an average equivalent weight within the range of 350–525 and optionally, cosurfactant and/or electrolyte. Other desirable additives can be incorporated into the microemulsion. These fluids do not phase separate as do emulsion drilling fluids; thus, the well can be "shut-in" for indefinite periods of time without the hydrocarbon and water separating.

PREFERRED EMBODIMENTS OF INVENTION

These water-external microemulsion fluids have advantages over common water-base muds in that they have lower fluid loss properties, permit increased drilling rates and bit life, they lubricate the drill string more efficiently, and they also maintain hole gauge and also reduce the overall drilling costs. More impressively, these fluids offer logging advantages over conventional ooil-based muds and water-based muds.

The water-external microemulsion contains water, hydrocarbon, sodium petroleum sulfonate, bentonite clay, and optionally cosurfactant and/or electrolyte, and/or weighting agent. Volume amounts of the above components include about 10% to about 90% and preferably about 50% to about 80% and more preferably about 50% to about 70% water, about 5% to about 90% and preferably about 5% to about 50% and more preferably about 5% to about 40% hydrocarbon, about 1% to about 30% and preferably about 2% to about 20% and more preferably about 5% to about 10% of the sodium petroleum sulfonate, about 0.1% to about 15% and preferably about 1% to about 10% and more preferably about 2% to about 6%, by weight, based on the water, of a water-dispersible clay (preferably bentonite clay), about 0.01% to about 20% and preferably about 0.1 to about 10% and more preferably about 1% to about 5% of a cosurfactant, and about 0.001% to about 5% and preferably about 0.01 to about 3% and more preferably about 0.01% to about 2.5% by weight (based on the water), of electrolyte. Preferably, the microemulsion contains up to about 70% and preferably about 5% to about 60%, and more preferably about 10% to about 50% of a weighting agent.

Other additives can be incorporated into the microemulsion to impart desired properties; for example, viscosity-increasing agents can be incorporated into the water phase such as acrylamide polymers, including homopolymers, copolymers, and terpolymers and partially hydrolyzed products thereof; viscosity increasing agents can be incorporated in the hydrocarbon phase, corrosion inhibitors, oxidation inhibitors, oxygen scavenging agents, bactericides, etc. However, such conponents of the microemulsion must be compatible with the other components of the microemulsion; that is, additives cannot be admixed with the microemulsion that will adversely influence the stability thereof, etc.

The hydrocarbon can be crude oil, both sweet and sour, partially refined fraction(s) of crude oil (e.g. gas oils, kerosene, naphthas, heavy naphthas, straightrun gasoline, liquefied petroleum gases, and other cuts from crude columns (i.e. liquids obtained within a particular boiling point range during the fractionation of the crude oil); refined fractions of crude oil (e.g. propane, butane, pentane, decane, "finished" gasoline, diesel fuel, jet fuel, benzene, xylene, toluene, ethylene, propylene, butylene and other types of olefins, cyclohexane, etc.); and synthesized hydrocarbons including halogenated hydrocarbons. A partially refined fraction of crude oil or crude oil is the preferred hydrocarbon. Also, unsulfonated hydrocarbon within petroleum sulfonates is useful as the hydrocarbon. Substituted hydrocarbons as well as mixtures of different hydrocarbons are useful.

The water can be fresh water, brackish water, or brine water. Where a high gel strength is desired, the water is preferably fresh or deionized water.

The petroleum sulfonate is a sodium petroleum sulfonate having an average equivalent weight within the range of about 350 to about 525 and preferably about 400 to about 470 and more preferably about 410 to about 440. The sulfonate can be a monosulfonate or a polysulfonated molecule. Also, the petroleum sulfonate can be 25% or more active sulfonate and is preferably at least 50% or more active sulfonate, and more preferably about 60 to about 80% active sulfonate, i.e. the petroleum sulfonate has about 60 to about 80% sulfonate molecules within the petroleum sulfonate. Petroleum sulfonate as used herein is the total moxture of petroleum sulfonate product and most generally includes unreacted hydrocarbon (vehicle oil), reaction by-products such as salts, etc., along with the sulfonate molecules. The petroleum sulfonate can be a mixture of high, medium, and low average equivalent weight petroleum sulfonates. The necessity of the sulfonate cation being sodium and not one of the other alkali metals or ammonium is taught within the examples. Also, the petroleum sulfonate cannot be one containing a divalent cation since such a cation will not permit a microemulsion within the limits of the components defined in this invention, i.e. one would have an emulsion rather than a microemulsion if divalent cations were used.

Within the above equivalent weight range of 350-525, the petroleum sulfonates exhibit both oil and water solubility. It is preferred that the sulfonic acid used to obtain the petroleum sulfonate be extracted with an aqueous alcohol solution to obtain three phases, a top phase which contains mostly unreacted hydrocarbon and oil- soluble products, a middle phase which contains the petroleum sulfonate which has both oil- and water-solubility, and a bottom phase which has water and other water-soluble components.

The cosurfactant can be an alcohol, amine, ester, aldehyde, ketone, or an organic compound containing one or more of hydroxy, oxy, epoxy, amino, or like functional groups within the molecule and wherein the molecule contains about 1 to about 20 or more and preferably about 3 to about 16 carbon atoms. Preferably, the cosurfactant is an alcohol and can contain, in addition to the hydroxy grouping(s), oxy and/or amino grouping(s) on the molecule. For example, the alcohol can be an ethoxylated alcohol or glycol. Examples of preferred cosurfactants include isopropanol, n- and i-butanol, amyl alcohols such as n-amyl alcohol, and p-amyl alcohol, 1- and 2-hexanol, 1- and 2-octanol, decyl alcohols, alkaryl alcohols such as p-nonyl phenol, and alcoholic liquors such as fusel oil. The alcohol can be primary, secondary, or tertiary alcohol. Also, mixtures of two or more of the same type, or different type of cosurfactants are useful with the microemulsion.

The electrolyte is a water-soluble compound and includes inorganic bases, inorganic acids, and inorganic salts. Examples include sodium hydroxide, sodium chloride, sodium sulfate, hydrochloric acid, sulfuric acid, sodium nitrate, ammonium chloride, ammonium hydroxide, potassium chloride, etc. Examples of other useful electrolytes are found in U.S. Pat. No. 3,330,343 to Tosch et al. The type and concentration of preferred electrolytes will depend upon the hydrocarbon, water, petroleum sulfonate, cosurfactant, reservoir fluids, reservoir temperature, the type of bentonite clay, etc.

The dispersible clay is preferably a bentonite clay; bentonites typically contain abundant montmorillonite, which absorbs or adsorbs more water, thus yielding higher viscosities and higher gel strengths at lower clay concentrations, than do other types of clays. An example of bentonite is Aquagel (a trademark of Baroid Division, National Lead Company, Houston, Texas, U.S.A. and identified as a Wyoming bentonite). Other useful clays are, for example, Baroco (a trademark of Baroid Division, identifying a clay not as rich in montmorillonite as the Aquagel clay); and Zeogel (a trademark of Baroid Division, identifying an attapulgite clay) and other like clay additives. The less refined clays, these clays of course are less expensive, such as Aquagel are especially useful with these microemulsions.

Weighting agents are preferably added to the microemulsion. Any weighting agent is useful as long as it is compatible with the other components of the microemulsion. Particularly preferred weighting agents include barite (a finely divided barium sulfate) and gelena (a finely divided lead sulfide).

The following additives can also be incorporated into the microemulsion: lost circulation agents such as plant fibers, shredded rubber, plastic foil, mica flakes, etc.; preservatives such as chemical bactericides, fungicides, and anti-fermentatives; oxygen scavenging agents such as formaldehyde; corrosion inhibitors, etc. Of course these additives must be compatible with the other components, i.e. they should not impart an overriding adverse influence to the stability of the microemulsion.

These fluids are useful with both rotary drilling rigs and cable tool rigs. Also, other types of drilling processes may use these fluids.

LABORATORY MEASUREMENTS

The microemulsions of this invention are tested for their properties by procedures set out in the American Petroleum Institute's Recommended Practice RP-13B, Second Edition, April, 1969. These procedures, however, are modified to measure mud properties at elevated temperatures.

Density of the microemulsion is expressed in lb/gal (pounds per gallon) of drilling fluid. The actual density was not measured, but the amount of weighting agent (barite) was calculated and admixed with the microemulsion to give a preselected weight of 10 lbs/gal in every sample within the examples.

The viscosity, yield point, and gel strength are measured with a multi-speed, direct-indicating Fann V-G viscometer (API RP-13B, pp. 5–6). This instrument was modified to measure the rheological properties at elevated temperatures by wrapping a heating coil around the sample cap, and letting the sample equilibrate to a preselected temperature before the measurement was done. The viscosity in centipoise can be expressed in two ways, i.e. plastic viscosity ($\mu_p$) or apparent viscosity ($\mu_a$). Yield point and gel strength are expressed in lb/100 sq ft (pounds per 100 square feet). The gel strength or thixotropy is measured by stirring the sample vigorously, then making measurements at 10 seconds and 10 minutes afterwards. The procedures for measuring these rheological properties with the Fann viscometer are disclosed in API RP-13B. The filtration tests are conducted at room temperature and at elevated temperature, using a high-temperature mud cell defined in U.S. Pat. No. 3,617,868 to Beitel et al.

Resistivity of the fluid is measured at room temperature and elevated temperature in the above indicated mud cell. Resistivity is reported in ohm-meters.

Necessity of sodium petroleum sulfonates

To emphasize the need of sodium petroleum sulfonates over other monovalent-cation-containing petroleum sulfonates, the following experiment is conducted. A microemulsion is obtained by mixing the following:

| | | Volume % |
|---|---|---|
| 1) | ammonium petroleum sulfonate | 14.8 |
| 2) | hydrocarbon (crude oil having a viscosity of 7 cp at 23°C.) | 19.5 |
| 3) | water (contains about 600 ppm of TDS) | 64.4 |
| 4) | cosurfactant (n-hexanol) | 1.3 |

To the above microemulsion there is added sufficient barite to obtain a mud density of 10 lbs/gal and there are added various types of clays, e.g. Aquagel clay, Baroco clay, and Zeogel clay. Upon the addition of all three types of clays, the microemulsion is phase-unstable, i.e. at least two and in some cases, six distinct phases will appear. Some of these phases differ only in the particle size of the clay, but others are of different composition from the original microemulsion. Refractive index measurements of the filtered fluids from each of these phases or layers support phase separation of the microemulsion. It is postulated that the phase separation is due to cation exchange between the ammonium petroleum sulfonate and cations held exchangeably on the clays. Such disrupts microemulsion composition and thus causes phase separation. That is, the clays seem to compete more vigorously for the available cations on the petroleum sulfonate, e.g. it is thought that the $NH_4^+$ cation is attracted preferentially to the clays where it replaced the $Mg^{++}$, $Ca^{++}$, $K^+$ and $Na^+$, the natural cations in the clays. The $NH_4^+$ cation on the sulfonate is replaced with probably the $Mg^{++}$ or the $Ca^{++}$ and these divalent cation-containing petroleum sulfonates are more oil-soluble and thus upset the HLB (hydrophil-lipophil balance) to obtain an unstable microemulsion or an emulsion.

Another water-external microemulsion is prepared similar to the first, except the ammonium petroleum sulfonate is substituted with a sodium petroleum sulfonate of the same equivalent weight. On addition of the above indicated clays to this microemulsion, the microemulsion is phase stable.

It is postulated that the order for most bentonites and similar clays in cation preference is:

$Na^+ < K^+ < Ca^{++} < Mg^{++} < NH_4^+$ The above preference means that $Ca^{++}$ will replace $Na^+$ on an exchange basis or that $NH_4^+$ will replace $Mg^{++}$, etc.

Thus, with sodium petroleum sulfonates, the $Na^+$ cations will not be replaced by the cations on the clays, because the clays are already saturated by cations such as $Mg^{++}$, $Ca^{++}$ which they prefer over $Na^+$ cation.

Rheological Properties

A water-external microemulsion is obtained by mixing 15.1 gms of a sodium petroleum sulfonate (average equivalent weight = 450, 65% active, 19.8 gm of a crude oil (viscosity = 7 cp at 23°C), 65.6 gm of water containing about 600 ppm of TDS (total dissolved solids) and 1.3 ml of n-hexanol. Sufficient amounts of barite are added to the microemulsion to obtain a density of 10 lbs/gal. To samples of the microemulsion there are added the Table 1, Table 2, and Table 3-indicated amounts of clay and the respective plastic viscosities, yield values and gel strength properties are determined:

Table 1

| Wt. % Dry Aquagel | Plastic Viscosity, $\mu_p$, in centipoises | Yield Value lbs/100 ft² | Gel strength 10 sec/10 min gel, lbs/100 ft² |
|---|---|---|---|
| 0 | 31 | 0 | 2.1/2.3 |
| 1.1 | 27 | 12 | 2.5/2.5 |
| 2.1 | 30 | 28 | 3.0/4.0 |
| 3.2 | 51 | 37 | 5.5/8.5 |
| 4.2 | 75 | 49 | 9.5/16.5 |
| 5.2 | 103 | 88 | 20.0/37.0 |

Table 2

| Wt. % Dry Baroco | Plastic Viscosity, $\mu_p$, in centipoises | Yield Value lbs/100ft$^2$ | Gel Strength 10 sec/10 min gel, lbs/100 ft$^2$ |
| --- | --- | --- | --- |
| 0 | 21.5 | 13 | 2/2 |
| 2.8 | 22 | 27 | 3/3 |
| 5.5 | 34 | 28 | 3/4 |
| 10.5 | 60 | 61 | 6/9 |
| 12.8 | 83 | 96 | 12/20 |

Table 3

| Wt. % Dry Zeogel | Plastic Viscosity, $\mu_p$, in centipoises | Yield Value lbs/100 ft$^2$ | Gel Strength 10 sec/10 min gel, lbs/100 ft$^2$ |
| --- | --- | --- | --- |
| 0 | 23 | 10 | 2/2 |
| 1.1 | 23 | 19 | 2.5/2.5 |
| 3.3 | 34 | 10 | 3/4 |
| 5.4 | 39 | 18 | 5/8 |
| 7.4 | 50 | 29 | 12/17 |
| 9.4 | 56 | 44 | 21/36 |
| 12.3 | 73 | 118 | 40/71 |

The above data indicate that the water-external microemulsion with the above three different types of clays exhibit properties which are suitable for field use. Also, the data indicate that the rheological properties increase with increasing concentrations of the clay. Also it is evident from these data that Aquagel (this clay contains more montmorillonite than the other two clays) produces a given set of properties with much less clay than the other two clays.

Temperature Effects

To show the effects of temperature on the rheological properties at different concentrations of clay, the microemulsion presented in the preceding example is duplicated, except for the Table 4 indicated amounts of Aquagel clay. Also, within Table 4, a comparative study is illustrated with a water-base mud (water containing 600 ppm of TDS, 5% of Aquagel clay, and sufficient amounts of barite to obtain a density of 10 lb/gal.) These data are illustrated in Table 4.

given concentrations of Aquagel clay, the plastic viscosities and yield points decrease with increasing temperature, whereas gel strengths increase with increasing temperature–these ranges can be advantageous from an operational standpoint. The comparative study with the water-based mud shows an increase in yield values with increasing temperature, just the reverse of the microemulsion systems. Also, the gel strengths along with the yield value suggest that the water-based mud may tend to "set-up" or solidify at high temperatures—this is not desirable.

Filtration and Resistivity Properties

The fluid loss or filtration properties and resistivity properties of the microemulsion as a function of clay concentration and temperature are studied. The same microemulsion is obtained but with the Table 5-indicated concentrations of Aquagel clay. As usual, the density of the microemulsions is adjusted to 10 lbs/gal Table 4

| Wt.% DryAquagel | Temp. °F. | Plastic Viscosity $\mu_p$, in centipoises | Yield Value lbs/100 ft$^2$ | Gel Strength 10 sec/10 min gel,lbs/100ft$^2$ |
| --- | --- | --- | --- | --- |
| 1 | 74 | 26 | 18 | 3/3 |
| " | 100 | 24 | 4 | 3/3 |
| " | 190 | 7 | 1 | 3/3 |
| 3 | 74 | 54 | 31 | 6/8 |
| " | 100 | 32 | 10 | 6/9 |
| " | 150 | 19 | 6 | 6/10 |
| " | 190 | 14 | 4 | 7/11 |
| 5 | 74 | 100 | 74 | 15/32 |
| " | 100 | 72 | 50 | 18/37 |
| " | 170 | 32 | 28 | 26/53 |
| " | 190 | 29 | 26 | 34/58 |
| 5 (water-base) | 74 | 13 | 8 | 17/36 |
| " | 100 | 11 | 8 | 18/38 |
| " | 160 | 9 | 11 | 24/62 |
| " | 190 | 7 | 19 | 36/72 |

From the above data, it is observed that the rheological properties of the microemulsion increase with increasing concentrations of Aquagel clay. Also, for with the addition of barite. Table 5 outlines these data and shows a comparative study with the previously indicated water-based mud:

Table 5

| Wt. % Dry Aquagel | Temp. °F. | Fluid Loss 30 Min, ml | Mud Resistivity ohm-meters |
|---|---|---|---|
| 1 | 74 | 15 | 0.723 |
| '' | 150 | 36 | 0.579 |
| '' | 290 | 80 | 0.227 |
| 3 | 74 | 2 | 1.683 |
| '' | 150 | 2 | 0.651 |
| '' | 220 | 4 | 0.477 |
| '' | 290 | 20 | 0.324 |
| 5 | 74 | 0 | 1.918 |
| '' | 100 | 2 | 1.303 |
| '' | 150 | 2 | 0.687 |
| '' | 200 | 2 | 0.506 |
| '' | 290 | 6 | 0.317 |
| 5 (water-base) | 74 | 13 | 6.479 |
| '' | 150 | 15 | 2.099 |
| '' | 290 | 49 | 1.049 |

From the above data, it is evident that:
1. the 3% and 5% Aquagel clay samples exhibit very low fluid loss properties—this is desirable to prevent formation damage, to stabilize the well bore, and to obtain correct log interpretation. Also, the fluid loss decreases with increasing Aquagel content and increases with increasing temperature.
2. the resistivities of these samples are better than those of conventional water-based muds. As Table 5 indicates, the resistivities of these microemulsions increase with increasing clay content and decrease with increasing temperature.
3. Compared with the water-based mud, i.e. 5% Aquagel concentration, the microemulsions show decidedly lower fluid loss properties and also much lower resistivities.

Comparing the 5% Aquagel clay content water-external microemulsion drilling fluid to a water-external emulsion drilling fluid, the latter will eventually be unstable and separate into two distinct phases. Within these two distinct phases, the water and oil-soluble properties of the components are necessarily distributed therein. However, the microemulsion remains stable throughout an indefinite period of time. It is evident that these two different types of drilling fluids within a well will perform differently, i.e. if a drilling rig is shut down for any length of time, the emulsion drilling fluid can separate into two distinct phases and thus upset the rheological properties of the drilling fluid. Whereas, if a microemulsion were present in this situation, it would maintain its integrity throughout the "shut-down" period.

It is not intended that this invention be limited by the specifics taught herein. Rather, all equivalents obvious to those skilled in the art are intended to be equated within the scope of the invention as defined within the specification and appended claims.

What is claimed is:

1. An improved fluid useful in the drilling of wells wherein a micellar dispersion comprised of water, hydrocarbon and petroleum sulfonate is used as the drilling fluid, wherein the improvement comprises using as the drilling fluid a water-external microemulsion comprised of about 10 to about 90% by volume water, about 5 to about 90% by volume hydrocarbon, about 1% to about 30% by volume of a sodium petroleum sulfonate having an average equivalent weight within the range of 350 to about 525, and about 0.01 to about 15% by weight, based on the water, of a water-dispersible clay.

2. The microemulsion of claim 1 wherein it contains about 0.01 to about 20% by volume cosurfactant.

3. The microemulsion of claim 2 wherein the cosurfactant is an alcohol containing about 1 to about 20 carbon atoms.

4. The composition of claim 1 wherein the microemulsion contains up to about 70% by weight of a weighting agent to obtain a density of about 8 to about 18 lbs/gal.

5. The composition of claim 1 wherein the concentration of the sodium petroleum sulfonate is about 2% to about 20%.

6. The microemulsion of claim 1 wherein the average equivalent weight of the petroleum sulfonate is about 400 to about 470.

7. The microemulsion of claim 1 wherein the water contains about 0.001 to about 5% by weight, based on the water, of an inorganic salt, inorganic base, or inorganic acid.

8. The microemulsion of claim 1 wherein the concentration of the water-dispersible clay is about 1.0 to about 10% by weight, based on the water.

9. The composition of claim 1 wherein the water-dispersible clay is a bentonite clay.

10. The composition of claim 1 wherein the microemulsion contains about 50% to about 80% water, about 5% to about 50% hydrocarbon, and about 5% to about 10% sulfonate.

11. In a process of drilling a well wherein a micellar dispersion comprised of hydrocarbon, water and petroleum sulfonate is used as a circulating drilling fluid, wherein the improvement comprising circulating in said well a water-external microemulsion which exhibits improves resistivity properties to permit better interpretation of electrical logging of the well and also which exhibits low fluid loss properties, the microemulsion comprised of about 50 to about 90% by volume water, about 10% to about 90% by volume of hydrocarbon, about 1 to about 30% of a sodium petroleum sulfonate having an average equivalent weight within the range of about 350 to about 525, about 0.01 to about 20% of an alcohol containing about 1 to about 20 carbon atoms, about 0.001 to about 5% by weight, based on the water, of an inorganic salt, about 0.1 to about 15% by weight, based on the water, of bentonite clay finely dispersed in the water phase, and up to about 705 of barite, finely dispersed in the water phase.

12. The microemulsion of claim 11 wherein the equivalent weight of the petroleum sulfonate is about 400 to about 470.

13. The microemulsion of claim 11 wherein the microemulsion contains about 1.0 to about 10% by weight, based on the water, of the bentonite.

14. The microemulsion of claim 1 wherein the hydrocarbon is a crude oil.

15. The microemulsion of claim 10 wherein the hydrocarbon is a partially refined fraction of crude oil.

* * * * *

UNITED STATES PATENT OFFICE
CERTIFICATE OF CORRECTION

Patent No. 3,899,431   Dated   August 12, 1975

Inventor(s)   John B. Hayes et al

It is certified that error appears in the above-identified patent and that said Letters Patent are hereby corrected as shown below:

Col. 1, line 42:     Delete "ahd" and insert --and--.

Col. 2, line 51:     Delete "ooil" and insert --oil--.

Col. 3, line 53:     Delete "moxture" and insert --mixture--.

Col. 10, line 52:    Delete "705" and insert --70%--.

Signed and Sealed this twenty-seventh Day of January 1976

[SEAL]

Attest:

RUTH C. MASON
Attesting Officer

C. MARSHALL DANN
Commissioner of Patents and Trademarks